Nov. 23, 1943.   S. L. V. DAVENPORT   2,335,175
IMPLEMENT ATTACHMENT FOR TRACTORS
Filed Sept. 20, 1941
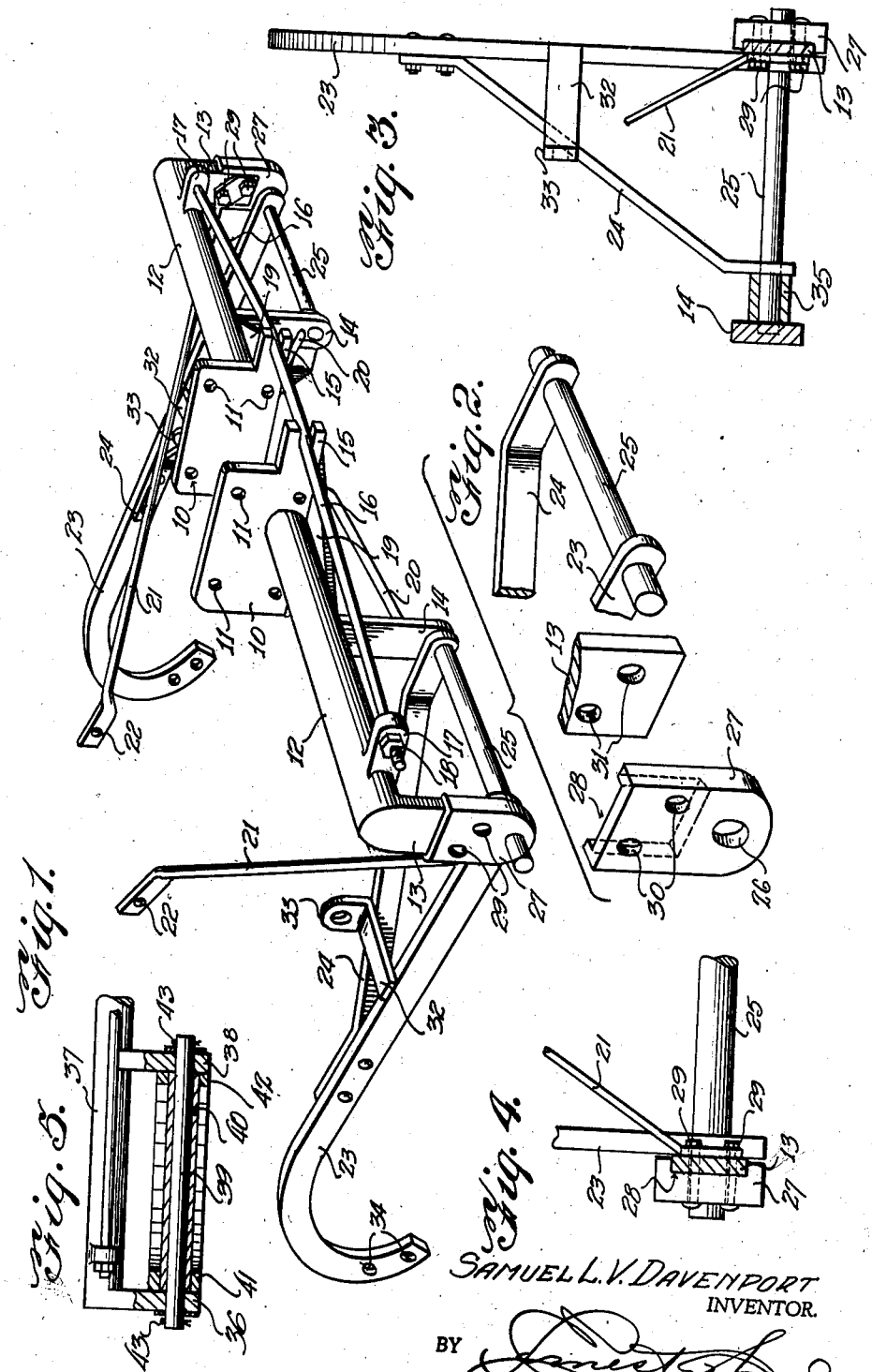
Samuel L. V. Davenport
INVENTOR.
BY
ATTORNEY Patented Nov. 23, 1943

2,335,175

UNITED STATES PATENT OFFICE 2,335,175

IMPLEMENT ATTACHMENT FOR TRACTORS

Samuel L. V. Davenport, Red Oak, Tex.

Application September 20, 1941, Serial No. 411,611

2 Claims. (Cl. 97—47)

This invention relates to agricultural implements and it refers particularly to a plow beam hitch for tractors.

The principal object of this invention is to provide a novel device for convenient securement to a farm tractor for drawing plows and which device includes the plow beams, disposed on either side of the tractor, between the front and rear wheels, the combined arrangement being such that the beams are interchangeable from side to side and by which the spacing width of the plowed furrows is changed.

Another object of the invention is to provide a novel form of means for attaching the plow beams to and detaching the same from the mounting or hitch, which feature lends to the simplicity of the combination as a whole, making it readily convenient to reduce or increase the distance between the plows and consequently the spacing of the furrows.

Still another object of the invention is to provide, by reason of the arrangement set forth, a means by which minimum spacing of the plows may be effected which is desirable in cases where small variations in the widths between the furrows are required. In such cases, the positions of the plow beams are not required to be interchanged but only shifted laterally on their mountings.

With the foregoing objects as paramount, the invention has certain novel features of accomplishment, together with, other and lesser objects, to become manifest as the description proceeds, taken in connection with the accompanying drawing wherein:

Figure 1 is a perspective view of a plow hitch for tractors embodying the invention.

Figure 2 shows one of the plow beams fragmentarily with elements of attachment spaced apart.

Figure 3 is a plan view of one of the plow beams showing the means by which minor beam spacings are obtained, Figure 4 is a plan view showing in part, the elements illustrated in Figure 2 assembled, and Figure 5 is a slightly modified form of the invention.

Continuing with a more detailed description of the drawing, reference is primarily made to Figure 1 wherein reference numeral 10 denotes a pair of plates, one of which is affixed on either side of the forward end of the tractor chassis (not shown) by passing bolts through apertures 11 provided therefor in the plates. Welded or otherwise affixed to the plates 10 and extending outward therefrom are rods or beam supports 12. These members 12 may be of solid shafting or pipes and depending from either end are legs 13 and spaced inwardly from these legs and likewise depending from the members 12 are legs 14 which are slightly longer than the legs 13 for a purpose which will become apparent presently.

Each of the mounting plates 10 is provided with a bifurcated and forwardly extending projection 15 and these projections jointly receive the midsection of a strain rod 16, whose ends pass through apertures in lugs 17, welded or otherwise suitably connected to the members 12 near their outer ends. Nuts 18 are threaded onto the ends of the strain rod 16 to secure the same. Further bracing of the mounting is effected by triangular truss plates 19, welded along one edge to the members 12 and along another edge to the underside of a mounting plate 10. Angular brace rods 20 have their inner ends joined to the underside of the truss plates 19 while their outer ends are secured to the legs 14 of the members 12. As a means to brace the outer ends of the mounting with the frame of the tractor, angular brace rods 21 are joined to the depending legs 13 at the ends of members 12 and extend rearwardly and inwardly to the tractor frame and their inner ends are bolted thereto by passing bolts through the holes 22 in these rods.

Figure 1 shows the plow beams 23 in a position for plowing furrows of maximum relative spacing. Each beam has an oblique brace 24 and the free ends of both the beams and the braces are flush, to be received between the depending legs 13 and 14 of the mounting members 12. A shaft 25 is provided for each beam as a fulcrum it being passed through openings in the end of the beam and brace, as shown in Figure 2. One end of the shaft 25 is journaled in an opening in the depending leg 14 while the opposite end thereof is journaled in an opening 26 (Fig. 2) in a block or plate 27, recessed at 28 to conformably receive the depending leg 13 of the mounting. Bolts 29 are passed through holes 30 and 31 in the block 27 and the leg 13 respectively and, as apparent in Figures 3 and 4, they serve the dual purpose of securing the block 27 to the leg 13 as well as securing the outer end of the angular brace 21. Also, in securing the block 27 in position, the beam 23 is held operatively in the mounting.

Each of the beams 23 is provided with a plate 32, having an upturned eye 33 to which is connected the beam lift, (not shown) of conventional and well known construction. Each beam is also provided with the usual holes 34 to receive bolts for securing plows thereto.

In the event it is desired to reduce the width between the furrows, it is simply necessary to transfer the left beam to the right of the tractor and the right beam to the left. In this manner, the spacing between the furrows will be reduced by twice the space between the beam end and the end of its brace 24. This will not affect to any appreciable degree the position of the lifting eye 33.

In the event that it is required to vary the width between the furrows a matter of inches, this can be accomplished with the beams in the position shown or in interchanged position, through the medium of the sleeve 35, shown in Figure 3. Two of such sleeves are provided, one for each beam assembly and when the beams are positioned for maximum furrow width, the sleeve is in the position shown but if it is desired to reduce the width between the furrows a matter of the length of the overall length of the sleeves, then the latter are transferred to the opposite ends of the shafts 25, or between the beams ends and blocks 27.

A slightly modified form of the invention is shown in Figure 5. In this form, the block 27 is dispensed with and in its place, a leg 36, whose counterpart is identified in Figure 1 as 13, continues downward from a mounting bar 37 the same distance as a companion leg 38 and each leg is apertured to receive the ends of a shaft 39. A sleeve 40 is mounted on this shaft of a length equal to the distance between the legs 36 and 38, as shown. The ends of a beam 41 and a brace 42 are mounted to the sleeve 40 adjacent its ends and when the parts are assembled, cotter pins 43 or other retaining means, are provided on the extended ends of shaft 39 to prevent longitudinal displacement thereof.

Manifestly, the construction as shown and described is capable of some modification and such modification as may be construed to fall within the scope and meaning of the appended claims is also considered to be within the spirit and intent of the invention.

What is claimed is:

1. A plow beam hitch for tractors comprising a pair of mounting plates arranged to be affixed on either side of the front of a tractor and having outwardly extending, relatively spaced bars, a pair of downwardly extending legs on each of said bars, the inner leg of each pair of legs being provided with an aperture in its end, blocks removably mounted on the outer of said legs and having apertures aligned with those of said inner legs, a pair of plow beams, each having a fulcrum shaft whose ends are journaled in the apertures of said pairs of legs whereby to be interchangeable one with the other and a strain rod supported at its midsection by said mounting plates and having its ends joined to the outer ends of said bars to reinforce the same.

2. A plow attachment for tractors comprising a member extending transversely across the front of a tractor including a pair of mounting plates and laterally extending bars, a pair of downwardly extending legs carried by each of said bars in spaced apart relation and having apertures in the ends thereof, a block recessed to receive each of the outer of said legs and having an aperture in alignment with the apertures in the inner of said pair of legs, a pair of fulcrum shafts, each having its ends journaled in the apertures of said legs and blocks, a plow beam mounted on each of said shafts having an oblique brace likewise mounted on the shaft, said beams being interchangeable one with the other to vary the relative spacing thereof.

SAMUEL L. V. DAVENPORT.